United States Patent
Cherchali et al.

(10) Patent No.: US 7,545,745 B1
(45) Date of Patent: Jun. 9, 2009

(54) METHOD AND APPARATUS FOR CONTROLLING THE QUALITY OF SERVICE OF VOICE AND DATA SERVICES OVER VARIABLE BANDWIDTH ACCESS NETWORKS

(75) Inventors: Ali M. Cherchali, Jackson, NJ (US); Gagan Lal Choudhury, Marlboro, NJ (US); Gerald Murray Ezrol, Herndon, VA (US); Marius Jonas Gudelis, Holmdel, NJ (US); Thomas Joseph Killian, Westfield, NJ (US); Jerry A. Leger, Woodmere, NY (US); Norman L. Schryer, New Providence, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 803 days.

(21) Appl. No.: 11/036,861

(22) Filed: Jan. 14, 2005

Related U.S. Application Data

(60) Provisional application No. 60/537,256, filed on Jan. 16, 2004.

(51) Int. Cl.
*G08C 15/00* (2006.01)
(52) U.S. Cl. .......................... 370/232; 370/414; 370/493
(58) Field of Classification Search .................. 370/232, 370/414, 493
See application file for complete search history.

(56) References Cited

U.S. PATENT DOCUMENTS

| | | | |
|---|---|---|---|
| 5,497,371 A * | 3/1996 | Ellis et al. .................... 370/412 |
| 6,577,596 B1 | 6/2003 | Olsson et al. | |
| 6,721,325 B1 | 4/2004 | Duckering et al. | |
| 6,967,928 B1 * | 11/2005 | Kikuta ........................ 370/252 |
| 7,012,922 B1 * | 3/2006 | Unitt et al. ................ 370/395.1 |
| 7,224,703 B2 * | 5/2007 | Antal et al. .................. 370/473 |
| 2002/0178282 A1 | 11/2002 | Mysore et al. | |
| 2003/0086370 A1 * | 5/2003 | Woo ........................... 370/230 |
| 2003/0107991 A1 | 6/2003 | Tezuka et al. | |
| 2003/0174650 A1 * | 9/2003 | Shankar et al. ............. 370/235 |
| 2003/0202507 A1 | 10/2003 | Nishida et al. | |
| 2004/0073690 A1 | 4/2004 | Hepworth et al. | |
| 2004/0081197 A1 | 4/2004 | Liu | |

OTHER PUBLICATIONS

U.S. Appl. No. 10/873,579, "Establishing Traffic Priorities in a Voice Over IP Network", filed Jun. 22, 2004.

* cited by examiner

*Primary Examiner*—Jason E Mattis

(57) ABSTRACT

A terminal adapter for guaranteeing the quality of service of both voice and data packets is disclosed. Such quality is ensured by inserting gaps between successive data packets in a stream of multiplexed data and/or voice packets. A gap after a particular data packet is proportional to the size of that particular data packet. In this way, bandwidth is preserved for any voice packets that may have arrived during the transfer of the data packet as well as for any voice packets that arrive during the gap. The unconstrained upstream data bandwidth and the bandwidth used by voice calls may each be estimated by taking a plurality of instantaneous measurements of the available bandwidth and/or taking individual direct measurements. The size of data packets may be limited to a maximum size in order to ensure that time-sensitive voice packets experience only an acceptable delay in queue for transmission.

5 Claims, 4 Drawing Sheets

METHOD AND APPARATUS FOR CONTROLLING THE QUALITY OF SERVICE OF VOICE AND DATA SERVICES OVER VARIABLE BANDWIDTH ACCESS NETWORKS

CROSS REFERENCE TO RELATED APPLICATIONS

This application claims the benefit of U.S. Provisional Application No. 60/537,256, filed Jan. 16, 2004, which is incorporated herein by reference.

BACKGROUND OF THE INVENTION

This invention relates generally to Internet communications, and more particularly to Quality of Service techniques for transmitting packets from different communication sources across a packet switched network. Successful transmission of both synchronous content (e.g., voice) and asynchronous content (e.g., data) requires careful scheduling, particularly if the packet load from the asynchronous source can meet or exceed the network capacity. This creates the possibility of filling most of the network channel bandwidth with data packets, thereby undesirably delaying transmission of real-time voice conversation packets, causing delay jitters or even the loss of voice packets. If such delay jitters or losses of voice packets are not prevented, then the quality of voice content received at a destination may be severely degraded and may even cause the listener to drop the voice call. For example, when one or more users initiate data traffic during a Voice over IP call, the data will interfere with the voice packets causing poor voice quality at the listening destination. This problem is often a result of limited bandwidth in network access links such as cable and DSL that have slow upstream feed rates. While one solution to this problem is to restrict data packet throughput, excessive restrictions then may cause severe throughput loss to data transmissions, which is also not desirable.

Therefore, a solution is needed for a Voice over IP communication system that provides efficient use of network transmission links for both data and voice traffic, while at the same time establishing predictable Quality of Service for both data and voice transmissions. Prior attempts typically involved simply giving a higher priority to voice packets and/or slowing down data packet rates by inserting a gap of some fixed length between successive data packets.

SUMMARY OF THE INVENTION

The present inventors recognized that inserting a gap having a fixed length, while advantageous in many situations, is also disadvantageous in certain regards. Specifically, such fixed-length gaps will advantageously preserve bandwidth for voice calls. However, fixed-length gaps must be sized to ensure that any incoming voice packets are not unduly delayed. Therefore, many times, short data packets are followed or preceded by a relatively large gap, which results in increased latency of such short packets. Since the timeliness of such short packets typically determines the latency as perceived by the user, any unnecessary delays of these packets is undesirable. Additionally, since voice packets will not be significantly delayed by such short packets, inserting a long gap after such short packets is inefficient.

Therefore, the present inventors have invented a terminal adapter and an associated method for guaranteeing the quality of service of both voice and data packets. In accordance with one illustrative embodiment, the quality of service of voice and data calls processed by a terminal adapter in a data network is ensured by inserting gaps between successive data packets in a stream of multiplexed data and/or voice packets. Illustratively, a gap after a particular data packet is proportional to the size of that particular data packet. In this way, bandwidth is preserved for any voice packets that may have arrived during the transfer of the data packet as well as for any voice packets that arrive during the gap. In another illustrative embodiment, the upstream bandwidth available to data packets in the absence of any voice calls is estimated by taking a plurality of instantaneous measurements of the available bandwidth and using an exponential smoothing algorithm to estimate the current unconstrained upstream bandwidth available for data packets. In yet another illustrative embodiment, the upstream bandwidth used by voice calls is also estimated. In another illustrative embodiment, the size of data packets is limited to a maximum size in order to ensure that time-sensitive voice packets experience only an acceptable delay in queue for transmission.

These and other advantages of the invention will be apparent to those of ordinary skill in the art by reference to the following detailed description and the accompanying drawings.

DETAILED DESCRIPTION

Figure 1:
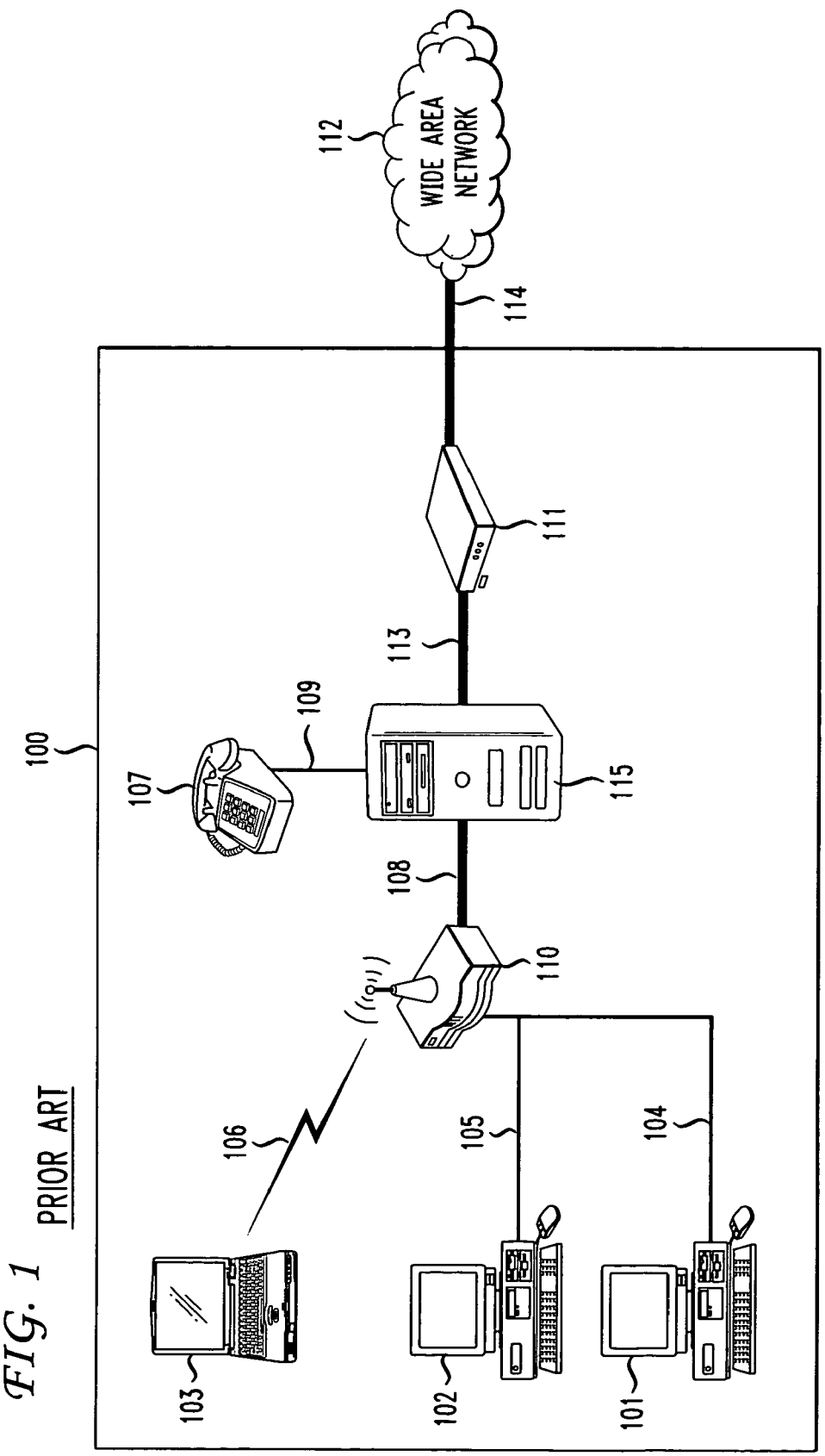
FIG. 1 shows a prior art network for transmitting both data and voice packets.

FIG. 1 shows a portion of an illustrative prior art packet network capable of carrying both voice and data traffic. Referring to that figure, access network 100 has a plurality of different types of terminals, such as computers 101, 102, and 103, and telephone 107. The data terminals are connected to a router 110 via, illustratively, links 104, 105, and 106, which may be wired links (i.e., links 104 and 105) or wireless links (i.e., link 106). There is a terminal adapter (TA) device 115 that connects to the data device router 110 over link 108 as well as the voice device telephone 107 over link 109. The TA 115 is connected to a DSL or cable modem device 111 over the link 113. The modem is connected to a Wide Area Network (WAN) 112 over a DSL or cable link 114. The TA 115 multiplexes voice and data traffic from the telephone 107 and the router 110 and forwards them towards the cable modem 111 for transmission over the WAN 112. Conversely, the TA 115 receives voice and data traffic from the WAN 112 through the modem 111, demultiplexes it, and forwards data traffic to Router 110 and voice traffic to telephone 107. In addition, the TA 115 also performs analog-to-digital (AD) and digital-to-analog (DA) conversion for voice traffic. Furthermore, the TA 115 also provides a buffer for voice packets in the WAN-to-telephones direction so that variable jitter experienced by voice packets over the WAN can be smoothed out before the DA conversion. One skilled in the art will recognize that several variations to the configurations shown in FIG. 1 are possible. As an example, the TA function may be integrated with the cable modem 111 or the router 110. As another example, there may not be any router 110 and the computers 101, 102 and 103 may be connected directly to TA 115. As yet another example, there may be multiple telephones connecting to the TA 115 instead of just one shown in FIG. 1.

Access network 100 is, illustratively, capable of transmitting both data and voice traffic simultaneously over the same access infrastructure (e.g., cable, DSL, etc) while maintaining a desired Quality of Service (QoS) for each type of traffic. As one skilled in the art will understand, voice traffic is more sensitive to excessive delays, delay jitters and losses in transmissions than is data traffic because such delays and losses may result in garbled, unintelligible voice received by the listener who in turn may, for example, hang up if the received voice quality is sufficiently poor. However, while data traffic is less sensitive to such delays, excessive delays and losses to data traffic are also undesirable since that may undesirably reduce data upload and download rates experienced by the end user. Therefore, a mechanism for prioritizing voice traffic is needed to ensure that the voice message quality remains high while, at the same time, delays experienced by data traffic remain low.

Figure 2:
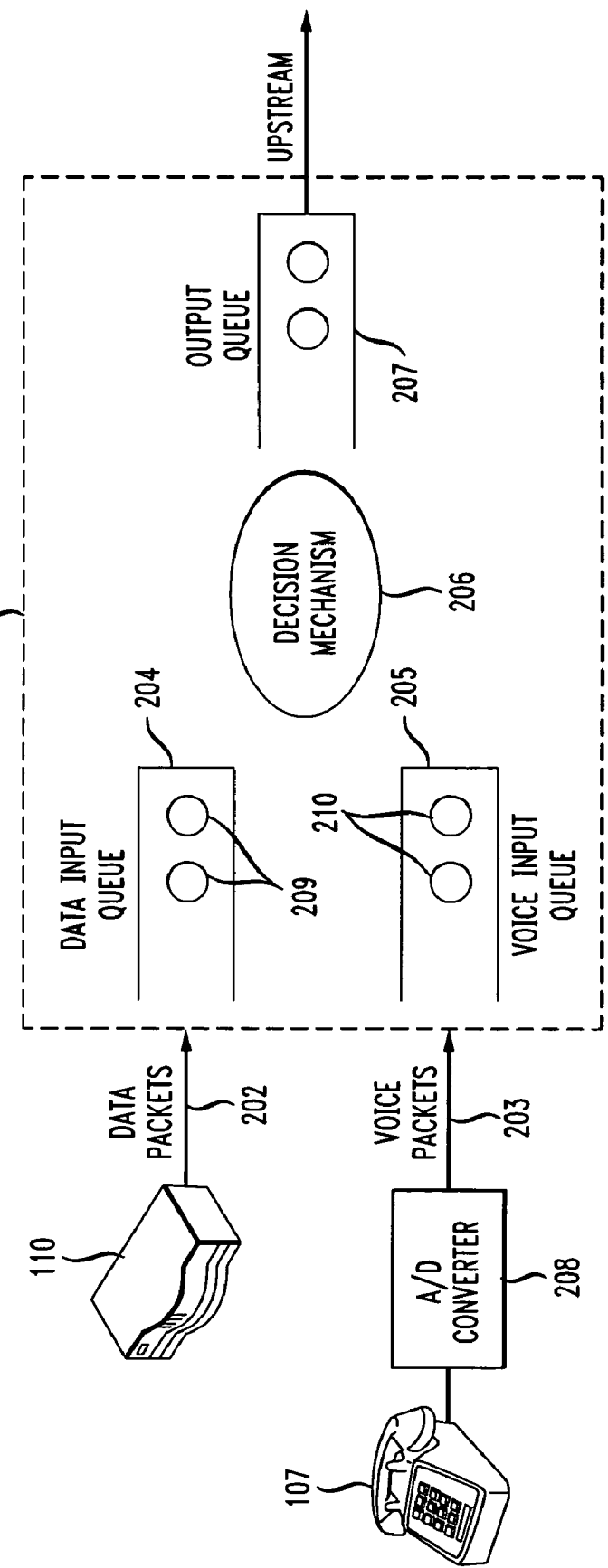
FIG. 2 shows a schematic diagram of a prior art terminal adapter used in the network of FIG. 1 for controlling the Quality of Service associated with the transmission of both voice and data packets.

FIG. 2 shows an illustrative prior art embodiment of terminal adapter 115 of FIG. 1 that is useful in ensuring the desired QoS is maintained for both voice and data packets. Referring to FIG. 2, terminal adapter 115 receives data packets 209 from router 110 transmitted along path 202 and stores them in the data input queue 204. Terminal adapter 115 also receives voice packets 210 from telephone 107 following A/D conversion by A/D converter 208 transmitted along path 203 and stores them in the voice input queue 205. One skilled in the art will recognize that there may be many data sources and voice sources although, illustratively, only one of each is shown in FIG. 2. In the case where multiple data and voice sources are used, data packets from all such data sources will be stored in data input queue 204 and voice packets from all such voice sources will be stored in voice input queue 205. Decision mechanism 206 then uses decision criteria, discussed below, to select packets from the data input queue 204 and the voice input queue 205 and forward those packets to output queue 207. Packets are then released from the output queue 207 and forwarded upstream through illustrative modem 111 in FIG. 1 to an intended destination, illustratively in WAN 112 of FIG. 1. Illustratively, the occupancy of the output queue 207 is monitored and used to make decisions as to when a data packet should be forwarded from the input queue 204 to the output queue 207, depending upon the occupancy level of output queue 207. It is also to be noted that it is possible for the decision mechanism 206 to make its decision based not just on the output queue 207 of TA 115 but also the output queue of some device further upstream, such as modem 111. One skilled in the art will recognize that monitoring the output queue of modem 111 could be easily implemented if the TA function and modem function are integrated in the same device, however such monitoring could still be implemented with separate devices as long as appropriate communications to monitor the output queue of modem 111 existed between the TA 115 and modem 111.

One skilled in the art will recognize that decision mechanism 206 may be, illustratively, implemented using a programmable computer having a processor, memory and storage media adapted to run a program to perform a wide variety of functions, including making the various determinations discussed herein. Such a decision mechanism may be implemented using either a stand-alone computer or such functionality may be integrated with any network device suitable for making such determinations. One skilled in the art will also recognize that the output queue 207 of the TA may be implemented in the same programmable computer as decision mechanism 206 or, alternatively, may be implemented in a stand-alone computer having processors, memory and storage media adapted to run software or firmware to enable the computer to queue voice and data packets and release those packets as called for by the program functions of the computer.

The present inventors have invented a method whereby the decision mechanism 206 in FIG. 2 manages the delay experienced by the voice and data packets in input queues 205 and 204, respectively, while maintaining QoS goals for both types of traffic. In particular, the decision mechanism transfers all voice packets 209/210 to the output queue 207 as soon as possible when they are detected in voice input queue 205. When no voice packets are present, however, the present inventors have recognized that it may be undesirable, for the reasons discussed previously, to utilize all available bandwidth to transmit data packets. Therefore, in one embodiment in accordance with the principles of the present invention, when a data packet is transferred to the output queue, a gap of time that is proportional to the size of that data packet is inserted either before or after the packet by a timing mechanism associated with the TA 115. This timing mechanism function may be integrated within the TA 115, such as within decision mechanism 206 or, alternatively, within another component of the TA or external to that network node. During this gap, no further data packets may be transferred to the output queue. If a voice packet arrives in the voice input queue 205 during this gap, it will be immediately transferred to the output queue for further transmission. The proportionality of the gap relative to a preceding or following data packet ensures that, for longer data packets, a larger gap is inserted that will accommodate more voice packets or voice packets of larger size. Thus, bandwidth is, in effect, reserved for the transmission of voice packets, thereby ensuring adequate voice quality. As one skilled in the art will recognize, a user's perception of quality of data service in the downstream direction is largely governed by the system response time to relatively small packets in the upstream direction, where downstream direction is defined as the direction from WAN 112 to router 110 and the upstream direction is defined as the direction from router 110 to WAN 112 in FIG. 1. For example, in many implementations, the data throughput in the downstream direction is a function of the latency experienced by upstream acknowledgement packets, which are typically small in size since each such acknowledgement packet allows another window of packets to be transmitted in the downstream direction. Of course downstream bandwidth would also be a constraining factor, but in many access networks, particularly ones using cable as a transmission medium, the downstream bandwidth is very high and so the main constraint comes from the latency of upstream acknowledgement packets. By inserting a smaller gap before or after such smaller data packets, the delay between such small ACK packets is minimized and, therefore, the downstream data rate is maintained at a relatively high level. At the same time, when no voice packets are present the maximum possible data transmission rate is sustained by ensuring ACK data packets experience only limited delays.

The present inventors have recognized that the size of a gap that is inserted between successive data packets should ensure that a desired maximum upstream bandwidth of such data packets is not exceeded. The desired maximum upstream bandwidth of data packets can be defined by the equation $$D = X*(U-V) \quad \text{(Equation 1)}$$

where D is the maximum upstream bandwidth for data packets (in Kbps); U is the unconstrained upstream bandwidth (in Kbps); V is the upstream bandwidth used by voice calls (in Kbps); and X is a variable selected to constrain the upstream data bandwidth. Illustratively, X is less than or equal to 1.

Since in accordance with the principles of the present invention the gap to be inserted between successive data packets is proportional to the size of the preceding data packet, the delay, or gap, T can be defined by the equation $$T = g*L \quad \text{(Equation 2)}$$

where T is the size of the delay/gap to be inserted (in milliseconds); L is the size of the preceding/following packet including overhead and payload (in bytes); and g is a constant gap per byte parameter in milliseconds per byte. Using the relationship in Equation 2, it is illustratively possible to develop another equation representative of the upstream maximum data transmission rate. Specifically, D in Equation 1 can also be expressed being constrained by the amount of data transmitted per gap. In such a case, D can be represented by the equation $$D = \frac{8*L}{g*L} = \frac{8}{g} \quad \text{(Equation 3)}$$

where D is once again the maximum upstream bandwidth for data packets (in Kbps); L is the size of the preceding packet (in bytes); and g is a constant gap per byte (in milliseconds per byte). Combining Equation 1 with Equation 3, results in the reduced equation $$g = \frac{8}{X*(U-V)} \quad \text{(Equation 4)}$$

and, therefore, the size of the gap represented by Equation 2 becomes $$T = \frac{8L}{X*(U-V)} \quad \text{(Equation 5)}$$

where the variables in Equations 4 and 5 are as discussed previously.

Thus, according to Equation 5, when U and V are known, the size of the delay T in milliseconds is a function solely of the length of the preceding data packet. One skilled in the art will recognize that, while the relationship in Equation 5 is shown using a specific relationship for g in terms of the variables U and V, one skilled in the art will recognize in light of the foregoing that the gap can be expressed as any desired general function of U and V. The use of any such function is intended to be encompassed by the teachings herein.

Figure 3:
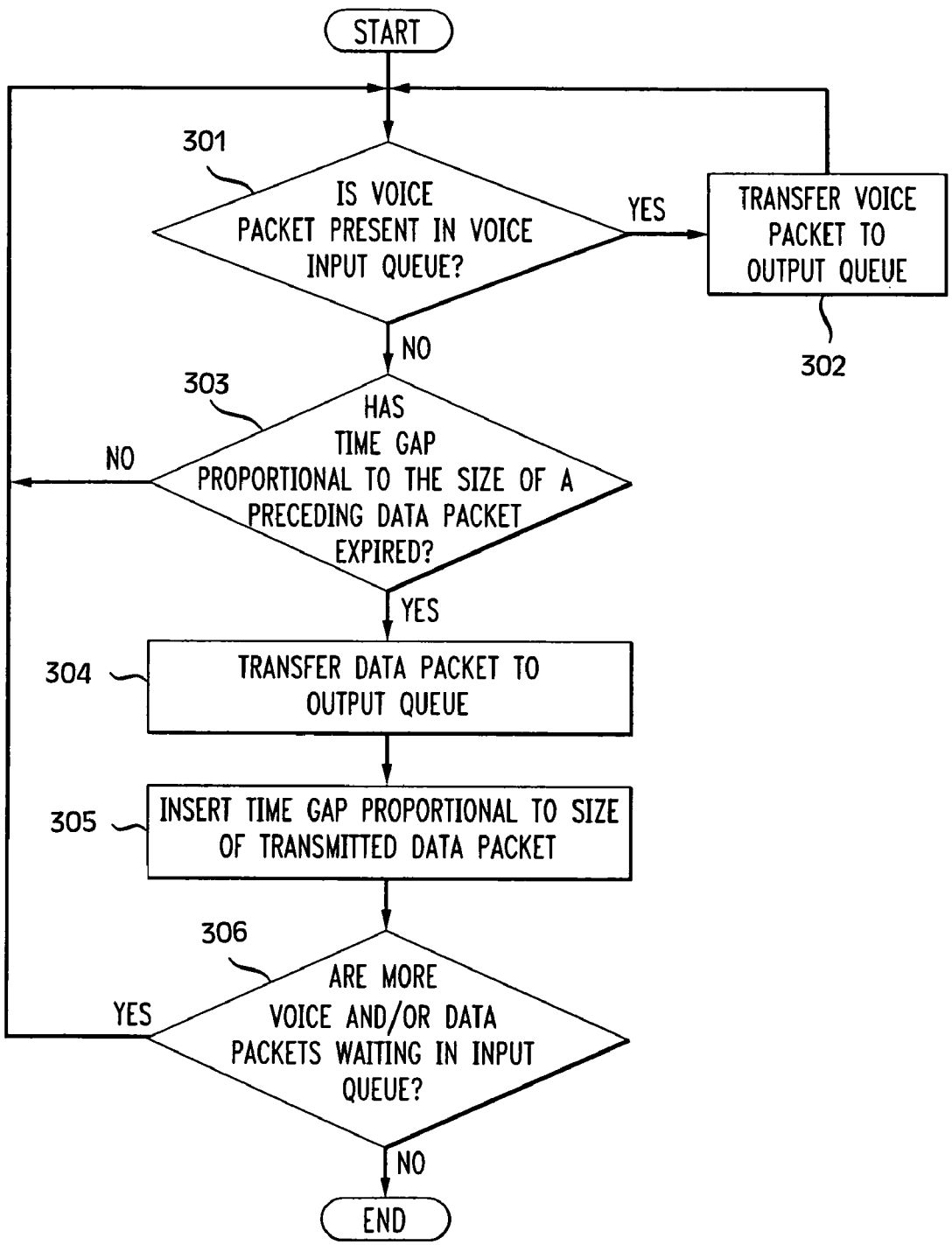
FIG. 3 shows a flow chart illustrating the steps of one embodiment of a method in accordance with the principles of the present invention whereby gaps proportional to the size of a preceding data packet are inserted between successive data packets.

FIG. 3 shows a flow chart of an illustrative method in accordance with the principles of the present invention whereby gaps proportional to the size of a preceding data packet are inserted by TA 115 in FIG. 1. Specifically, referring to FIG. 3, at step 301 a determination is made whether or not a voice packet is present in the voice input queue 205 in FIG. 2. If yes, then at step 302, the voice packet is transferred to output queue 207 in FIG. 2 and the determination is once again made at step 301. When there are no voice packets remaining in the voice input queue, then at step 303 a determination is made as to whether a time gap proportional to the size of a preceding data packet has expired. If the answer is no, then the determination is once again made at step 301 as to whether any voice packets are present in the voice input queue. Once there are no voice packets in the voice input queue and any time gaps have expired, then at step 304, a data packet in data input queue 204 is transferred to output queue 207 and, at step 305, a time gap proportional to the size of the transferred data packet is inserted before which no other data packets may be transferred to the output queue. Then, at step 306, a determination is made whether or not there are any further voice/data packets waiting in the respective input queues 205 and 204. If yes, then the determination is made once again at step 301. If not, then the process ends. One skilled in the art will recognize that the method of FIG. 3 may illustratively begin whenever the TA 115 of FIG. 1 is operationally processing voice and/or data packets and end when TA 115 stops processing or awaiting the arrival of voice and/or data packets. One skilled in the art will recognize, as discussed above, that instead of inserting gaps after a respective data packet, it may be desirable to insert delays before a data packet and then, upon the end of the delay period, transferring the data packet to the output queue 207 in FIG. 2. One skilled in the art will also recognize that, in addition to using different input queues for voice packets and data packets, separate input queues may be used for short data packets, such as short Acknowledgement (ACK) packets and for relatively longer data packets. Such an implementation is described in copending U.S. patent application Ser. No. 11/000,677, entitled "Method and Apparatus for Controlling the Quality of Service of Voice and Data Services Over Variable Bandwidth Access Networks," and is hereby incorporated by reference herein in its entirety. In such a case of separate queues for larger and relatively smaller data packets, it may be desirable to only insert delays before or after the long data packets, for example those that exceed a certain size threshold. Such an implementation would prevent the delay of short data packets which, as discussed above, often dictate the quality of the network as perceived by the end user.

Figure 4A:
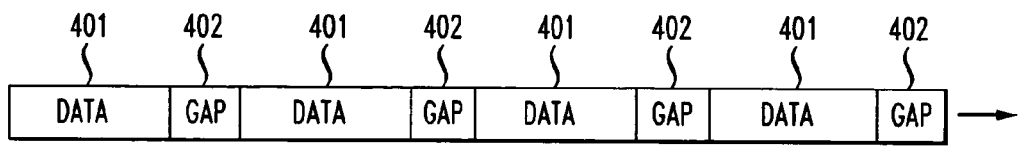
FIGS. 4A, 4B and 4C show illustrative data streams whereby the gaps described above in association with FIG. 3 are inserted between successive data packets.
Figure 4B:
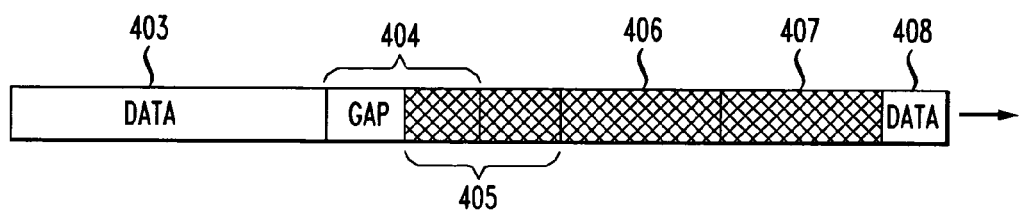
Figure 4C:
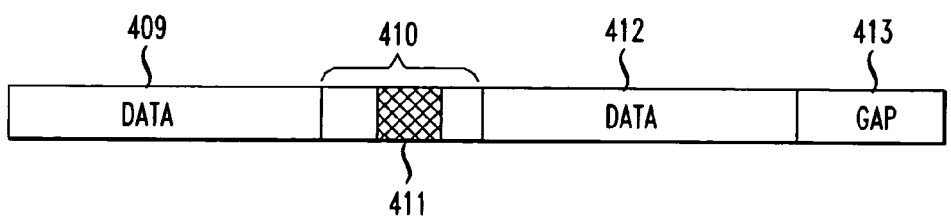

FIGS. 4A, 4B, and 4C show illustrative streams of voice and data packets transmitted by the output queue of TA 115 of FIG. 1 and multiplexed with the gaps described herein in accordance with the method of FIG. 3. Specifically FIG. 4A represents the case where no voice packets are present in the voice input queue of 205 of FIG. 2, and only data packets are being transferred. Referring to that figure, data packets 401 of, illustratively, the same size are transmitted and gaps 402, which are proportional to the size of the data packets 401, are inserted between each successive data packet and the preceding packet. FIG. 4B shows one illustrative stream that will result when multiple voice packets are present. Specifically, referring to FIG. 4B, when data packet 403 is transmitted, gap 404 is inserted after that packet. Thus, data packets may not be transmitted until the end of gap 404. However, if voice packets arrive in voice input queue 205 in FIG. 2, then they are not subject to waiting until the end of the gap. Thus, voice packets 405, 406 and 407 will be transferred to output queue 207 as soon as possible once they arrive in voice input queue 205, even though the gap 404 applied after data packet 403 has not expired. This same procedure applies for any gap between successive data packets: if voice packets arrive in the input queue, they are transferred to the output queue at the earliest opportunity even if a gap is still pending for the data packets. If no voice packets are present after voice packet 407, then data packet 408 is transmitted since the gap 404 has ended.

FIG. 4C shows a second illustrative stream that may result if a voice packet is present in input queue 205 in FIG. 2. Specifically, if no voice packets are initially present, as in the case of FIG. 4B, data packet 409 is transferred to output queue 207 in FIG. 2 and a proportionate gap 410 is inserted prior to the end of which no data packets can be transmitted. If voice packet 411 enters queue 205, then it is immediately transferred to output queue 207 even though, once again as in the case of FIG. 4B, gap 410 has not ended. However, in this case, once voice packet 411 has been transmitted, even though there are no other voice packets in voice input queue 205 in FIG. 2, data packet 412 will not be transmitted until gap 410 ends. At this time, after gap 410 ends, data packet will be transferred to output queue 207, followed by the insertion of a new gap 413. Once again, one skilled in the art will recognize that gaps may be inserted before a data packet is transferred to output queue 207.

As discussed above, if U (the unconstrained upstream data bandwidth) and V (the upstream bandwidth used by voice calls) are known, the size of a gap to be inserted after a data packet is purely a function of the size of that data packet. However, upstream bandwidth represented by the values of U and V may not be directly known through measurement. This is because the available upstream bandwidth will vary from user to user and over time even for the same user due to, illustratively, different levels of service provided by different network (e.g., Internet) service providers, as well as other factors, such as the number of subscribers sharing the same upstream channel. However, while U and V may not be known, these parameters may be estimated in accordance with the principles of the present invention. Specifically, for a given period of time, measurements are taken of the unconstrained upstream bandwidth (i.e., the upstream bandwidth available to data packets in the absence of any voice calls). These measurements may be taken, illustratively, by the TA 115 in FIG. 2 or, alternatively by a suitable device at any other network node with this device providing the measurements periodically to the TA 115. In such a case, the TA or other device may take initial measurements of the unconstrained upstream bandwidth during the boot or reboot time of the device to obtain a baseline of measured bandwidth. Then, the device may periodically remeasure the unconstrained upstream bandwidth. A best current estimate of the upstream bandwidth may be derived using, for example, an exponential smoothing algorithm using past measurements of the upstream bandwidth. One illustrative algorithm for obtaining such a current estimate may be expressed by the equation $$U(n+1) = a*(Um(n+1)+U(n)*(1-a)) \quad \text{(Equation 6)}$$

where $U(n+1)$ is the current $(n+1)$th estimate of the unconstrained upstream bandwidth U; $Um(n+1)$ is the $(n+1)$th measurement of U; $U(n)$ is the estimate of U based on n measurements; and a is a variable, referred to herein as an updating factor, having a selected value in the range $0 \leq a \leq 1$ that will dictate how quickly the estimate of U changes with changes in the most recent measurement of U. The higher the value of the updating factor a, the more weight is given to the most recent measurement of U, $Um(n+1)$ relative to the previous estimate of U, $U(n)$. While it may be desirable in some cases to adjust quickly to a new measurement of U and, hence, use a large value of a, in situations where successive measurements of U are likely to vary widely from each other, a smoother estimate obtained with a lower value of a may be desired. One skilled in the art will recognize in light of the foregoing how to select a value of the updating factor a that is appropriate for a particular implementation.

The upstream bandwidth used by voice calls, V, may also be estimated. Since there are no constraints placed on voice calls, it is much easier to directly measure the bandwidth used by voice packets as compared to measuring the value of U discussed above. Thus, for example, no exponential smoothing is necessary. In particular, a value for V in Kbps may be obtained by the illustrative equation $$V = 8 * \left(\frac{P}{T_i}\right) \quad \text{(Equation 7)}$$

where V is the upstream bandwidth used by voice calls; P is the voice packet size including payload and overhead data; and $T_i$ is the voice packetization interval (i.e., the time it takes to transmit the voice packet) in milliseconds. One skilled in the art will recognize that P and $T_i$ may be known as properties of a particular voice call or these parameters may be estimated by observing the size and separation between successive voice packets in a voice call as they arrive at the TA 115 in FIG. 2.

Therefore, in accordance with the foregoing description, data packets and voice packets are multiplexed with proportional gaps inserted between successive data packets. However, while bandwidth is thus reserved for voice packets, which do not have to wait for the end of these gaps, if a particularly large data packet is currently being transmitted when a voice packet enters voice input queue 205 in FIG. 2, then that voice packet will have to wait for transmission, even though it is transferred to the output queue 207 as soon as possible. This is due to the fact that, once a packet (voice or data) is transferred to the output queue 207, bandwidth is committed for that packet. It is, of course, desirable to reduce the wait of time-sensitive voice packets as much as is practicable. Therefore, in one embodiment in accordance with the principles of the present invention, a desired maximum size may be imposed on incoming data packets. Thus, voice packets will be subject to a maximum delay corresponding to the maximum imposed size of a preceding data packet. One skilled in the art will recognize in light of the foregoing that such a maximum imposed size may be a general function of the estimated unconstrained upstream bandwidth (e.g., proportional to the bandwidth). In one illustrative embodiment, where the well known Transfer Control Protocol (TCP) is used, the desired maximum size of a data packet may be achieved by the appropriate setting of the Maximum Segment Size (MSS) parameter. One skilled in the art will recognize that other methods of fragmenting large packets into smaller packets conforming to the desired maximum packet size may also be used.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Other arrangements will also be obvious to those skilled in the art. For example, as discussed above, while the principles of the present invention are discussed herein in association with the wired voice networks, the principles of the present invention can be used with any method of communication. Those skilled in the art could implement various other feature combinations without departing from the scope and spirit of the invention.

The invention claimed is:

1. A method for improved quality of service of voice and data calls in a packet network, said network adapted to transmit voice and data packets, said method comprising:
   transmitting a first data packet;
   taking a plurality of measurements of at least a first unconstrained upstream data bandwidth available in said network;
   estimating a second unconstrained upstream data bandwidth as a function of said plurality of measurements;
   determining a voice upstream bandwidth; and
   delaying the transmission of a second data packet transmitted after said first data packet, said delay a function of the size of at least one of said first data packet and said second data packet and a function of said second unconstrained upstream data bandwidth and said voice upstream bandwidth,
   wherein said delay T between said first data packet and said second data packet is calculated by the equation $$T = \frac{8L}{X*(U-V)}$$

where L is the size of the preceding packet including overhead and payload (in bytes); U is the unconstrained upstream bandwidth (in Kbps); V is the upstream bandwidth used by voice calls (in Kbps); and X is a variable selected to constrain the upstream data bandwidth.

2. The method of claim 1 wherein said second unconstrained upstream data bandwidth is calculated by the equation $$U(n+1)=a*Um(n+1)+(1-a)*U(n)$$

where U(n+1) is the second unconstrained upstream data bandwidth; U(n) is the value of the unconstrained upstream data bandwidth after n measurements; Um(n+1) is the value of the (n+1)th measurement of the unconstrained upstream data bandwidth; and a is an updating factor.

3. The method of claim 1 further comprising:
   prior to the step of transmitting, fragmenting said first data packet into a plurality of smaller data packets.

4. The method of claim 1 further comprising:
   after the step of transmitting said first data packet, receiving a voice packet; and
   transmitting said voice packet prior to the end of said delay.

5. A method for improved quality of service of voice and data calls in a packet network, said network adapted to transmit voice and data packets, said method comprising:
   transmitting a first data packet;
   taking a plurality of measurements of at least a first unconstrained upstream data bandwidth available in said network;
   estimating a second unconstrained upstream data bandwidth as a function of said plurality of measurements;
   determining a voice upstream bandwidth; and
   delaying the transmission of a second data packet transmitted after said first data packet, said delay a function of the size of at least one of said first data packet and said second data packet and a function of said second unconstrained upstream data bandwidth and said voice upstream bandwidth;
   wherein said voice upstream bandwidth is a function of a voice packetization interval and a voice packet size; and
   wherein said voice upstream bandwidth is defined by the equation $$V = 8*\left(\frac{P}{T_i}\right)$$

where V is the voice upstream bandwidth; $T_i$ is the voice packetization interval; and P is the voice packet size.

* * * * *